United States Patent
Mirsky et al.

(10) Patent No.: US 10,841,207 B2
(45) Date of Patent: Nov. 17, 2020

(54) METHOD AND APPARATUS FOR SUPPORTING BIDIRECTIONAL FORWARDING (BFD) OVER MULTI-CHASSIS LINK AGGREGATION GROUP (MC-LAG) IN INTERNET PROTOCOL (IP) NETWORKS

(71) Applicant: Telefonaktiebolaget LM Ericsson (publ), Stockholm (SE)

(72) Inventors: Gregory Mirsky, Pleasanton, CA (US); Evgeny Tantsura, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/084,963

(22) PCT Filed: Apr. 29, 2016

(86) PCT No.: PCT/IB2016/052461
§ 371 (c)(1),
(2) Date: Sep. 13, 2018

(87) PCT Pub. No.: WO2017/158402
PCT Pub. Date: Sep. 21, 2017

(65) Prior Publication Data
US 2019/0058653 A1    Feb. 21, 2019

Related U.S. Application Data

(60) Provisional application No. 62/308,594, filed on Mar. 15, 2016.

(51) Int. Cl.
*H04L 12/24* (2006.01)
*H04L 12/723* (2013.01)
(Continued)

(52) U.S. Cl.
CPC .......... *H04L 45/28* (2013.01); *H04L 41/0654* (2013.01); *H04L 41/0677* (2013.01);
(Continued)

(58) Field of Classification Search
CPC . H04L 45/245; H04L 45/741; H04L 43/0811; H04L 69/40
(Continued)

(56) References Cited

U.S. PATENT DOCUMENTS

2010/0111085 A1* 5/2010 Bauchot ............ H04N 21/2668
370/390
2010/0195651 A1* 8/2010 Dayong .............. H04L 12/4641
370/390

(Continued)

OTHER PUBLICATIONS

Aggarwal R., et al., "Bidirection Forwarding Detection (BFD) for MPLS Label Switched Paths (LSPs)," Internet Engineering Task Force (IETF); RFC 5884, Jun. 2010, pp. 1-12.
(Continued)

*Primary Examiner* — Khaled M Kassim
*Assistant Examiner* — Jason A Harley
(74) *Attorney, Agent, or Firm* — Sage Patent Group

(57) ABSTRACT

Methods and apparatuses for enabling sub-seconds link failure detection in a multi-chassis link aggregation group (MC-LAG) system are described. A first network device of a packet network transmits an IP packet over a first link that is part of the MC-LAG, where the MC-LAG couples the first network device with a second network device and a third network device and the second and third network devices are part of an Inter-Chassis Redundancy (ICR) system. The IP packet includes a payload including a Bidirectional Forwarding Detection (BFD) control packet, where the destination address of the IP packet is one of a multicast IP address and a broadcast IP address.

18 Claims, 9 Drawing Sheets

(51) Int. Cl.
    *H04L 12/761*     (2013.01)
    *H04L 12/749*     (2013.01)
    *H04L 12/703*     (2013.01)
    *H04L 12/709*     (2013.01)

(52) U.S. Cl.
    CPC .......... *H04L 45/245* (2013.01); *H04L 45/741* (2013.01); *Y02D 50/30* (2018.01)

(58) Field of Classification Search
    USPC ....................................................... 370/216
    See application file for complete search history.

(56) References Cited

U.S. PATENT DOCUMENTS

| | | | | |
|---|---|---|---|---|
| 2011/0286324 | A1* | 11/2011 | Bellagamba | H04L 45/50 370/219 |
| 2013/0258839 | A1* | 10/2013 | Wang | H04L 45/28 370/221 |
| 2015/0381466 | A1* | 12/2015 | Sontakke | H04L 43/10 370/241.1 |
| 2015/0381486 | A1* | 12/2015 | Xiao | H04L 43/10 370/237 |
| 2016/0000822 | A1* | 1/2016 | Emanuele | A61K 45/06 514/16.4 |
| 2016/0006822 | A1* | 1/2016 | Kloberdans | H04L 63/0236 709/204 |
| 2016/0007316 | A1* | 1/2016 | Vaidya | H04W 64/003 370/312 |

OTHER PUBLICATIONS

Bahadur N., et al., "LSP-Ping and BFD for MPLS-TP—draft-nitinb-mpls-tp-lsp-ping-bfd-procedures-00," Internet Engineering Task Force (IETF), Jul. 5, 2009, pp. 1-15.

Bhatia M., et al., "IP Address Schemes for Bidirectional Forwarding Detection (BFD) on Link Aggregation Group (LAG) Interfaces—draft-mmsn-bfd-on-lags-address-00," Internet Engineering Task Force (IETF), Feb. 9, 2012, pp. 1-5.

Bocci M., et al., "MPLS Generic Associated Channel; Standards Track, Network Working Group," Request for Comments: 5586, Jun. 2009, 19 pages.

IEEE Standard for Local and metropolitan area networks—Link Aggregation; IEEE Std 802.1AX-2008, the Institute of Electrical and Electronics Engineers, Inc., New York, NY, USA, 2008, 162 pages.

Katz D., et al., "Bidirectional Forwarding Detection (BFD) for IPv4 and IPv6 (Single Hop)," Internet Engineering Task Force (IETF) Request for Comments: 5881, 2010, pp. 1-7.

Katz D., et al., "Bidirectional Forwarding Detection (BFD)," Internet Engineering Task Force (IETF) Request for Comments: 5880, IETF Trust., 2010, pp. 1-49.

RFC:7130: Bhatia M., et al., "Bidirectional Forwarding Detection (BFD) on Link Aggregation Group (LAG) Interfaces," Internet Engineering Task Force (IETF) Request for Comments: 7130, Feb. 2014, pp. 1-11.

* cited by examiner

METHOD AND APPARATUS FOR SUPPORTING BIDIRECTIONAL FORWARDING (BFD) OVER MULTI-CHASSIS LINK AGGREGATION GROUP (MC-LAG) IN INTERNET PROTOCOL (IP) NETWORKS

CROSS-REFERENCE TO RELATED APPLICATIONS

This application is a National stage of International Application No. PCT/IB2016/052461, filed Apr. 29, 2016, which claims the benefit of U.S. Provisional Application No. 62/308,594, filed Mar. 15, 2016, which are hereby incorporated by reference.

TECHNICAL FIELD

Embodiments of the invention relate to the field of packet networks; and more specifically, to link failure detection in a multi-chassis link aggregation group.

BACKGROUND

In packet data networks, Link Aggregation Group "LAG" and in particular Multi-Chassis "MC-LAG" are widely used to improve network resiliency and/or bandwidth availability between network devices. A Layer 2 (L2) LAG comprises multiple links directly connecting physical network interfaces of two network devices in a network. A load balancing decision is performed at the forwarding plane of a network device, to distribute traffic across the different links of the LAG. Thus, a LAG combines a number of physical network interfaces (or ports) together to make a single high-bandwidth data path, so as to implement the traffic load sharing among the member network interfaces in the group and to enhance the connection reliability. An MC-LAG refers to a LAG that directly connects one network device with two or more other network devices.

Internet Engineering Task Force (IETF), Request for Comments (RFC) 7130 entitled "Bidirectional Forwarding Detection (BFD) on Link Aggregation Group (LAG) Interfaces," defines a protocol enabling failure detection of a link member of a LAG. The use of BFD for failure detection over a LAG provides a fast failure detection even in the absence of Link Aggregation Control Protocol (LACP) (which is part of an Institute of Electrical and Electronics Engineers (IEEE) specification (802.3ad) and is typically the protocol used to detect failure in a LAG). IETF RFC 7130, enables the verification of link continuity for every member link of the LAG using BFD. The approach taken in IETF RFC 7130 is to run an Asynchronous mode BFD session over each LAG member link and use BFD to control whether a LAG member link should be part of the Layer 2 load-balancing table of the LAG interface. Each Asynchronous mode BFD session that runs over a LAG member link can be referred to as a "micro-BFD session."

However, IETF RFC 7130 does not address the case of applying BFD to an MC-LAG environment, in which a network device is coupled with at least two separate network devices through the MC-LAG. Current approaches rely on LACP to detect link failure in an MC-LAG environment. However since LACP has a minimal timer which can be set at 1 second, thus the failure detection convergence time in a system that runs LACP is generally at least 3 seconds. Thus at best failure detection performed through LACP is in the single seconds range.

SUMMARY

The embodiments described present methods and apparatuses for enabling sub-seconds link failure detection in an MC-LAG system.

In one embodiment, a method in a first network device in a packet network of enabling link failure detection in a multi-chassis link aggregation group (MC-LAG), is described. The method includes transmitting an Internet Protocol (IP) packet over a first link that is part of the MC-LAG, where the MC-LAG couples the first network device with a second network device and a third network device that are part of an Inter-Chassis Redundancy (ICR) system. The IP packet includes a payload including a Bidirectional Forwarding Detection (BFD) control packet, where the destination address of the IP packet is one of a multicast IP address or a broadcast IP address.

In one embodiment, a first network device in a packet network for enabling link failure detection in a multi-chassis link aggregation group (MC-LAG), the first network device includes one or more processors and a non-transitory computer readable storage medium, said non-transitory computer readable storage medium containing instructions, which when executed by the one or more processors, causes the first network device to transmit an Internet Protocol (IP) packet over a first link that is part of the MC-LAG, where the MC-LAG couples the first network device with a second network device and a third network device that are part of an Inter-Chassis Redundancy (ICR) system. The IP packet includes a payload including a Bidirectional Forwarding Detection (BFD) control packet, where the destination address of the IP packet is one of a multicast IP address or a broadcast IP address.

In one embodiment, a non-transitory machine-readable storage medium that provides instructions that, if executed by a processor of a first network device, will cause said processor to perform operations including transmitting an Internet Protocol (IP) packet over a first link that is part of the MC-LAG, where the MC-LAG couples the first network device with a second network device and a third network device that are part of an Inter-Chassis Redundancy (ICR) system. The IP packet includes a payload including a Bidirectional Forwarding Detection (BFD) control packet, where the destination address of the IP packet is one of a multicast IP address or a broadcast IP address.

In one embodiment, a method in a first network device in a packet network of enabling link failure detection in a multi-chassis link aggregation group (MC-LAG) is described. The method comprises receiving an Internet Protocol (IP) packet over a first link that is part of the MC-LAG, where the MC-LAG couples the first network device with a second network device, where the first network device is part of an Inter-Chassis Redundancy (ICR) system, where the IP packet includes a payload including a Bidirectional Forwarding Detection (BFD) control packet, and where the destination address of the IP packet is one of a multicast IP address and a broadcast IP address; and determining based on the BFD control packet that the first link is still active.

In one embodiment, a first network device in a packet network for enabling link failure detection in a multi-chassis link aggregation group (MC-LAG) is described. The first network device comprises one or more processors and a non-transitory computer readable storage medium, said non-transitory computer readable storage medium containing instructions, which when executed by the one or more processors, cause the first network device to receive an Internet Protocol (IP) packet over a first link that is part of the MC-LAG, where the MC-LAG couples the first network device with a second network device, where the first network device is part of an Inter-Chassis Redundancy (ICR) system, where the IP packet includes a payload including a Bidirectional Forwarding Detection (BFD) control packet, and the destination address of the IP packet is one of a multicast IP address and a broadcast IP address; and determine based on the BFD control packet that the first link is still active.

In one embodiment, a non-transitory machine-readable storage medium that provides instructions that, if executed by a processor of a first network device, will cause said processor to perform operations comprising receiving an Internet Protocol (IP) packet over a first link that is part of a multi-chassis link aggregation group (MC-LAG), where the MC-LAG couples the first network device with a second network device, where the first network device is part of an Inter-Chassis Redundancy (ICR) system, where the IP packet includes a payload including a Bidirectional Forwarding Detection (BFD) control packet, and wherein the destination address of the IP packet is one of a multicast IP address and a broadcast IP address; and determining based on the BFD control packet that the first link is still active.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
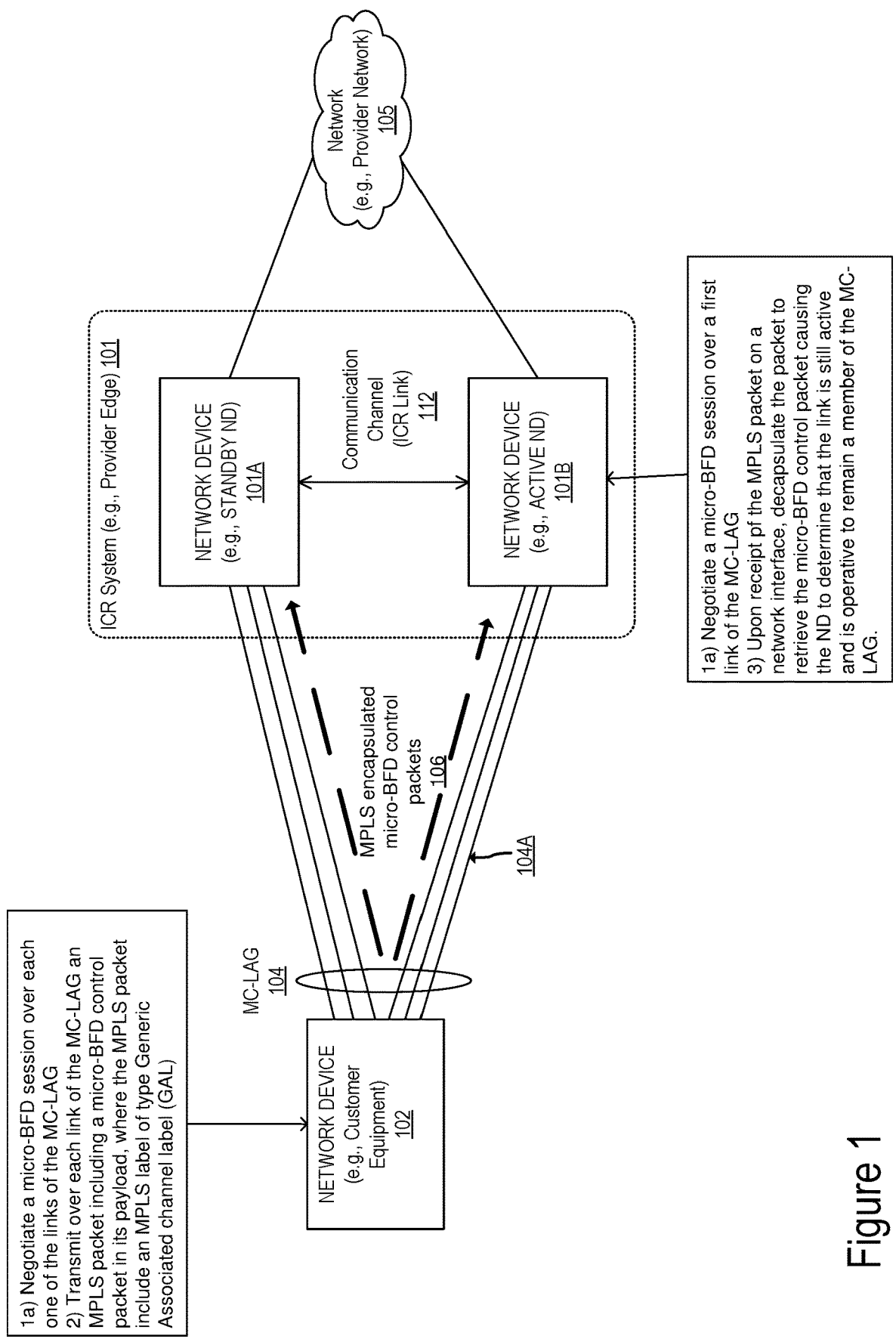
FIG. 1 illustrates a block diagram of an exemplary network including an Inter-Chassis Redundancy (ICR) system coupled with a network device through an MC-LAG enabling link failure detection according to some embodiments of the invention.

The following description describes methods and apparatus for enabling link failure detection in a Multi-Chassis Link Aggregation Group. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

IETF RFC 7130 defines that a single micro-BFD session, for every enabled address family, runs on each member link of the LAG. In some embodiments, the micro-BFD session's negotiation follows the same procedures defined in IETF RFC 5880 and IETF RFC 5881. In BFD over LAG, an Asynchronous mode is used. In this mode, the network interfaces part of a link member of the LAG, for which a micro-BFD session is established, periodically send BFD Control packets to one another, and if a number of those packets in a row are not received by the other network interface, the micro-BFD session is declared to be down. The micro-BFD sessions on the member links are independent BFD sessions. Each micro-BFD session uses unique local discriminator values, maintains a set of state variables, and has independent state machines.

In BFD for LAG, since the micro-BFD sessions are established per-LAG-member link, the procedure for the reception of BFD control packets is performed based on the detection of a micro-BFD over LAG session and based on the "Your Discriminator" of the BDF control packet field when it is nonzero. In this case, the network interface on which the micro-BFD control packets arrived corresponds to the network interface associated with that session. IETF RFC 7130 defines the BFD control packets for each micro BFD session to be IP/UDP encapsulated as defined in IETF RFC 5881, with a new UDP destination port 6784.

IETF RFC 7130 defines that micro-BFD control packets use a destination IP address that is configured on the peer system and can be reached via the LAG interface transmitting the packet. IETF RFC 7130 indicates that the address family for this destination IP address needs to be used in a consistent manner across the links of a given LAG. However, IETF RFC 7130 does not specify a selection of the destination IP address for transmitting the micro-BFD control packet. In a LAG environment a unicast IP address can be used to transmit the micro-BFD control packets to the peer network device. However in an MC-LAG environment, the use of unicast IP addressing, where a different destination address is used for each peer network device would transform the system into a set of single-hop BFD sessions and would cancel the advantages of having micro-BFD sessions. Further, the use of a single unicast IP address may not work in an MC-LAG scenario as the member links are terminated on separate network devices.

BFD on MC-LAG with IP/MPLS Data Plane:

The embodiments described herein present methods and apparatuses for enabling failure detection over an MC-LAG system using BFD. FIG. 1 illustrates a block diagram of an exemplary network including an Inter-Chassis Redundancy (ICR) system 101 coupled with ND 102 through an MC-LAG 104 according to some embodiments. ICR system 101 typically includes two network devices 101A and 101B. However, while in some embodiments, the ICR system is described with regard to two network devices (e.g., a first device acting as an active device and a second network device acting as a standby device); in other embodiments, a different number of devices can be included as part of the ICR system. For example, the redundant system may include N network devices acting as active devices and M network devices acting as standby devices without departing from the scope of the present invention. In some embodiments, the active ND is responsible for handling (i.e., processing and forwarding) network traffic received from one or more other network devices (e.g., ND 102). In other embodiments, the traffic received at the ND 102 can be distributed according to a load balancing mechanism towards the two network devices ND 101A and ND 101B according to the availability of the links of the MC-LAG. In some embodiments, Virtual Router Redundancy Protocol (VRRP) can be implemented on each one of the network devices of the ICR system 101 and define a VRRP group and can be used to manage the redundancy system and the states of each of the network devices within the system.

The two network devices ND 101A and ND 101B are coupled to each other through a communication channel referred to herein as an inter-chassis redundancy link 112. The ICR link enables the two network devices to exchange control messages as well as traffic (i.e., data packets). In some embodiments, each one of the NDs 101A-B and 102 is implemented as described in further details below with respect to FIGS. 7A-E.

In some embodiments, the NDs 101A, 101B and 102 may be part of a packet network coupling a subscriber with a service offered over the packet network. A subscriber is connected to the service via one or more network devices (NDs) of the packet network. Some NDs of the packet network provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge or Customer Equipment). In some embodiments, the ICR system 101 implements a PE, while the ND 102 implements a CE. The CE couples one or more end users' devices to a provider's network 105 through the PE. The content and/or services are typically provided by one or more provider end stations (e.g., server end stations) belonging to a service or content provider. Examples of such content and/or services include, but are not limited to, public webpages (e.g., free content, store fronts, search services), private webpages (e.g., username/password accessed webpages providing email services), and/or corporate networks over VPNs, etc. In other embodiments, the network devices may be part of other types of networks without departing from the scope of the present invention.

In a first exemplary embodiment, the network devices 102 and 101A-B implement Multiprotocol Label Switching (MPLS) and in particular they are operative to use Generic Associated Channel Label (GAL). In this first exemplary embodiment, the elements of the MC-LAG 104 (links coupling respective network interfaces of NDs 101A-B and 102) use micro-BFD sessions to detect failures occurring in the link members of the MC-LAG.

In these embodiments, the elements of the MC-LAG system are configured such that ND 101A and ND 101B of the ICR system 101 appear as a single network device both with respect to the Link Aggregation control protocol (LACP) and micro-BFD. This results in a seamless use of BFD over LAG for detection of link failures at the MC-LAG 104. In some embodiments, for LACP that can be achieved through configuration. For micro-BFD the present embodiments use MPLS GAL for transmission of the BFD control packets. In these embodiments, the micro-BFD control packets (i.e., control packets associated with a respective micro-BFD session) are encapsulated with a GAL header as a single label in the MPLS stack as will be described in further details below.

At operations 1*a* and 1*b*, for each link of the MC-LAG 104 a micro-BFD session is negotiated. In some embodiments, the control plane of each ND 101A-B and 102 initiates a BFD session negotiation for each one of the links of the MC-LAG 104, coupling network interfaces of the respective network devices. For example, a micro-BFD session is established for link 104A, which couples a first network interface of ND 102 with a second network interface of ND 101B. During this initial step an IP destination address is selected. The IP destination address is used in the transmission of MPLS packets including the micro-BFD control packets of the micro-BFD sessions.

Once the micro-BFD sessions are established for the links of MC-LAG 104, micro-BFD control packets are asynchronously transmitted, at operation 2, from a first ND (e.g., ND 102) towards the ND including the peer network interfaces (e.g., ND 101A and 101B) for example through the link 104A. While the following description describes micro-BFD control packets transmitted from ND 102 to ND 101B through the link 104A, one of ordinary skill in the art will recognize that each of one of the links members of the MC-LAG may transmit micro-BFD control packets asynchronously through a peer interface on a peer network device and the operations described herein with respect to link 104A apply to other links of the MC-LAG without departing from the scope of the present invention.

Thus in these embodiments, for each micro-BFD session, micro-BFD control packets are encapsulated with an MPLS header which includes a Generic Associated channel header (ACH). The MPLS encapsulated micro-BFD control packets 106 are then transmitted towards the peer network interface on the peer ND. Depending on a channel type specified in the Generic Associated Channel Header (ACH), micro-BFD control packets may be transmitted with or without IP and UDP headers.

Figure 2A:
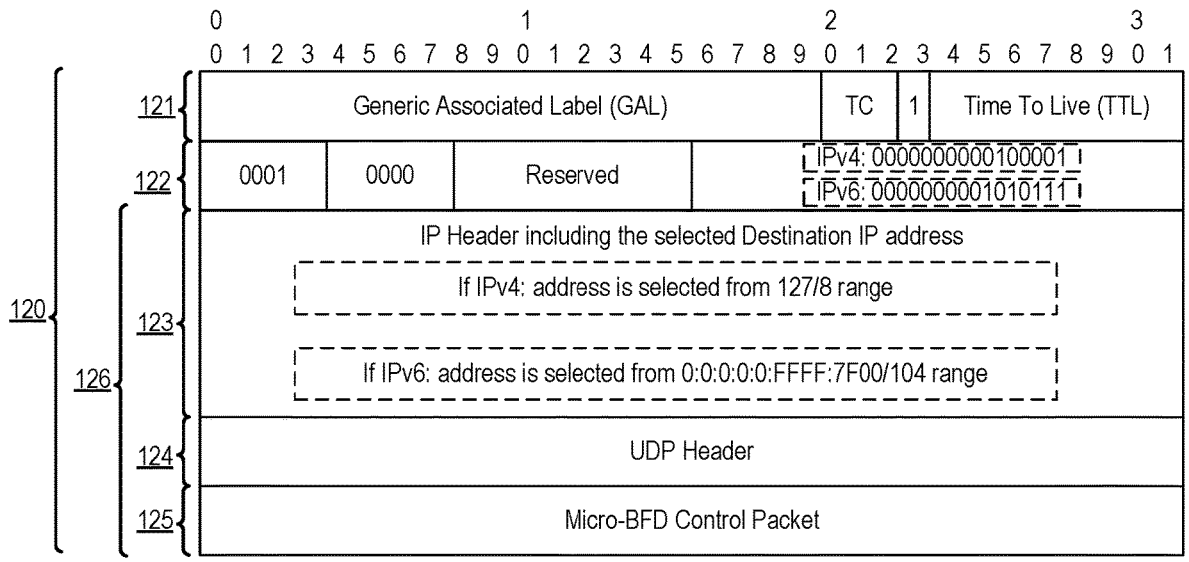
FIGS. 2A-B illustrate an exemplary MPLS encapsulated micro-BFD packets according to some embodiments of the invention.

FIG. 2A illustrates an exemplary MPLS encapsulated micro-BFD packet according to some embodiments of the invention. The packet 120 includes an MPLS Label 121, a Generic Associated Channel header 122, an IP header 123, an UDP header 124 and a micro-BFD control packet 125. The micro-BFD control packet is associated with the session established for the link transmitting the packet (e.g., link 104A). The label 121 indicates that the label is a Generic Associated Label (GAL) as the first 20 bits include a value of 13. The next 3 bits (TC) include a Traffic Class field for class of service (CoS) priority and Explicit Congestion Notification (ECN). The next 1 bit is a flag indicating the bottom of the MPLS stack. In this embodiment, this bit is set to a value of 1 indicating that the current label is the last one in the MPLS stack. The label ends with an 8-bit TTL (time to live) field. The label 121 is followed with a Generic Associated Channel header (ACH) 122. The first field of the 122 header is set to 0001 to indicate a control channel, followed with a version field set to 0. Bits 8 to 15 of the ACH are reserved and set to 0 (these bits are ignored on reception). Bits 16 to 31 are used to encode the Channel Types. The Channel Type field indicates the type of message carried on the associated control channel, e.g., IPv4 or IPv6 when IP demultiplexing is used for messages sent on the associated control channel. For example, the Channel Type field can include a value 33 (i.e., "0000000000100001") when IPv4 is used. Alternatively, the Channel Type field can include a value 87 (i.e., "0000000001010111") when IPv6 is used. The packet further includes an IP header 123 and an UDP header 124. The various fields that may be included in an IP header and an UDP header are well known and will not be described in detail herein. Depending on the IP protocol used, the IP header 123 includes as the destination address the selected destination address associated with the two network devices 101A and 101B of the ICR system 101. For example, the destination address may be selected from the range of addresses 127/8 for IPv4, while it is selected from the range of addresses "0:0:0:0:0:FFFF:7F00/104" when IPv6 is used. Thus the use of the selected addresses enables the micro-BFD control packets transmitted to a peer network interface to loop back inside the host as the address is assigned for use as the Internet host loopback address. The packet further includes the micro-BFD control packet 125.

Figure 2B:
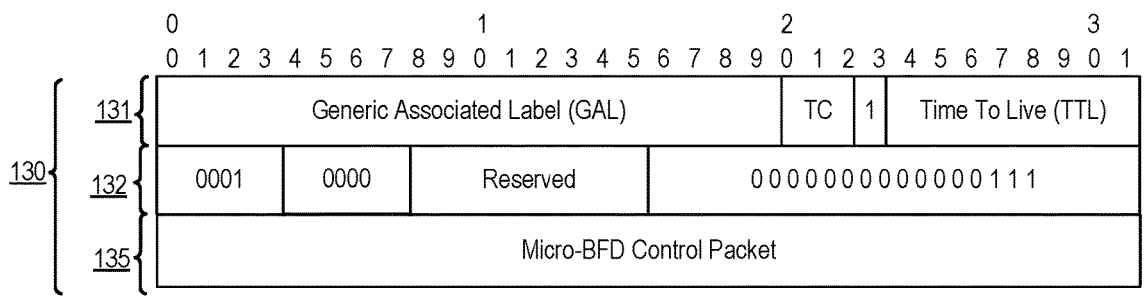

FIG. 2B illustrates an exemplary MPLS encapsulated micro-BFD packet according to an alternative embodiment of the invention. The packet 130 includes an MPLS Label 131, a ACH 132 and a micro-BFD control packet 135, where the micro-BFD control packet is associated with the session established for the link transmitting the packet (e.g., link 104A or another link of MC-LAG 104). The label 131 indicates that the label is a Generic Associated Label (GAL) as the first 20 bits include a value of 13. The next 3 bits (TC) include a Traffic Class field for class of service (CoS) priority and Explicit Congestion Notification (ECN). The next 1 bit is a flag indicating the bottom of the MPLS stack. Similarly to the previous embodiment, this bit is set to a value of 1 indicating that the current label is the last one in the MPLS stack. The label ends with an 8-bit TTL (time to live) field. The label 131 is followed with an ACH 132. The first field of the 132 header is set to 0001 to indicate a control channel, followed with a version field set to 0000. Bits 8 to 15 of the ACH are reserved and set to 0 (these bits are ignored on reception). Bits 16 to 31 are used to encode the Channel Types and include a value of 7 (i.e., "0000000000000111") indicating that the packet includes a BFD control packet (i.e., "BFD Control, Pseudo-Wire (PW)-ACH encapsulation (without IP/UDP Headers)"), where the BFD control packet is associated with a micro-BFD session (associated with a link of the MC-LAG).

Referring back to FIG. 1, flow then moves from operation 2 to operation 3, at which ND 101B, upon receipt of the MPLS packet on a network interface, decapsulates the packet to retrieve the micro-BFD control packet causing the ND to determine that the link is still active and is operative to remain a member of the MC-LAG. In some embodiments, when the MPLS encapsulated packet includes IP/UDP header (e.g., the MPLS encapsulated packet 120 including IP/UDP headers 123, 124), upon decapsulation of the MPLS label, the payload of the MPLS packet is processed at the IP stack based on the destination address of the packet. In these embodiments, since the IP destination address is associated with the local host of the network device (e.g., a loopback address of ND 101B), the IP packet is consumed locally without being forwarded to other network devices of the network. The present embodiments enable the BFD control packets to be forwarded from ND 102 to the next hop network device ND 101B without the risk of being forwarded outside this device. Upon receipt of the micro-BFD control packet, ND 101A determines that the link associated with the micro-BFD session is still active.

The same template of packets (i.e., either template 120 or template 130) is used by ND 102 on all member links of the LAG, regardless of whether it is connected to ND 101A or ND 101B enabling the detection of failure at the MC-LAG based on BFD sessions established on each link. The use of MPLS encapsulation (with or without IP/UDP) allows communication of micro-BFD control packets to each network device of the ICR system 101 as a single aggregation system. According to these embodiments, micro-BFD control packets are transmitted using MPLS encapsulation enabling the network devices of the MC-LAG to detect link failure based on the BFD protocol allowing detection of link failure as fast as 10 msec. As a result, convergence within the MC-LAG redundant group can be in sub-second range (i.e., milliseconds range) interval which is far better then what can be provided with the use of standard LACP.

The operations in the flow diagram of FIG. 3 will be described with reference to the exemplary embodiments of the FIGS. 1, 2A-B. However, it should be understood that the operations of the flow diagrams can be performed by embodiments of the invention other than those discussed with reference to the other figures, and the embodiments of the invention discussed with reference to these other figures can perform operations different than those discussed with reference to the flow diagram of FIG. 3. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 3:
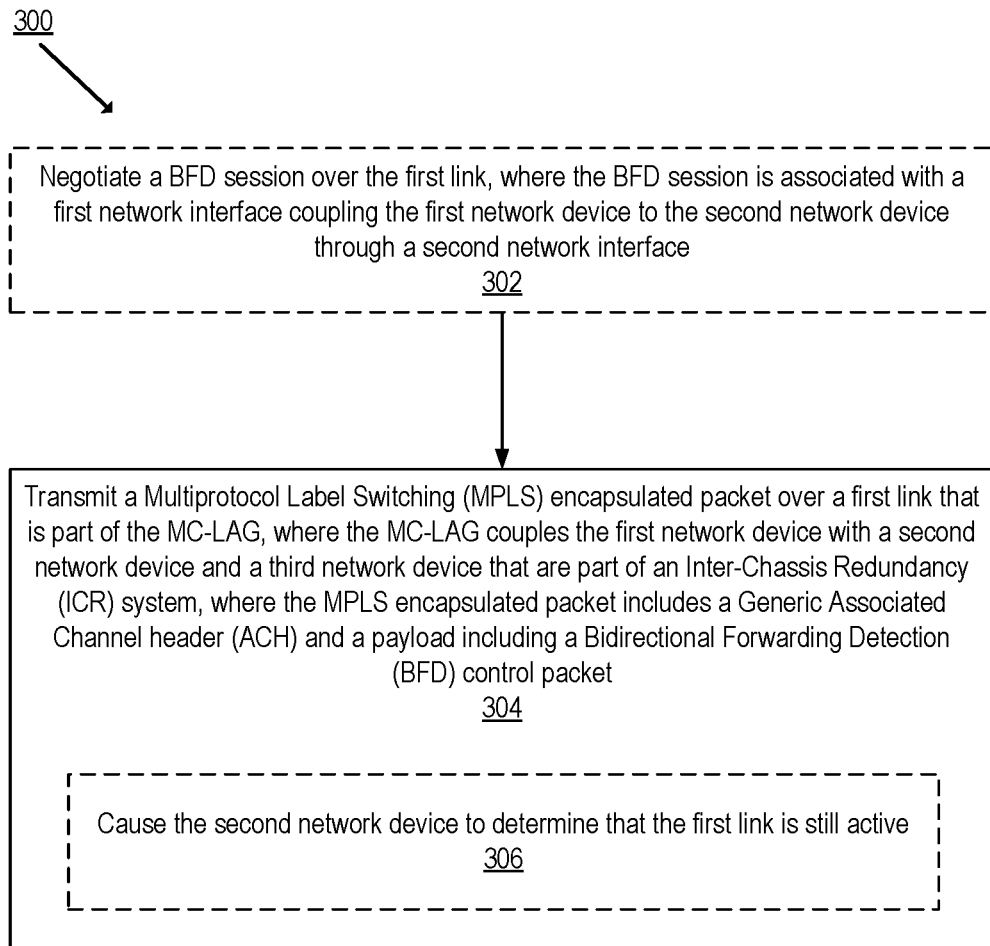
FIG. 3 illustrates a flow diagram of exemplary operations for enabling link failure detection in an MC-LAG according to some embodiments of the invention.

FIG. 3 illustrates a flow diagram of exemplary operations 300 for enabling link failure detection in an MC-LAG according to some embodiments of the invention. At operation 302 a first network device (e.g., ND 102) negotiates a BFD session over a first link (e.g., link 104A) with a second network device (e.g., ND 101B). The BFD session is associated with a first network interface coupling the first network device to the second network device through a second network interface of the second network device. The first ND transmits an MPLS encapsulated packet (e.g., 130 or 120) over the first link of the MC-LAG, where the MC-LAG couples the first network device with the second network device and a third network device (e.g., ND 101A). The second and third network devices are part of an Inter-Chassis Redundancy (ICR) system (101). The MPLS encapsulated packet (120 or 130) includes a Generic Associated Channel header (ACH) (122 or 132) and a payload (e.g., 126) that includes a Bidirectional Forwarding Detection (BFD) control packet 125 or 135. While in FIG. 2A the payload 126 includes an IP header, an UDP header and a micro-BFD control packet 125 in other embodiments, the payload may include more or less headers and data (for example as illustrated in FIG. 2B where the payload only include micro-BFD control packet 135). The BFD control packet is associated with the BFD session over the first link (e.g., link 104A) and the MPLS encapsulated packet is transmitted towards the second network device causing the second network device to determine that the first link is still active.

BFD on MC-LAG with Internet Protocol Data Plane:

Having described embodiments of the invention providing link failure detection in an MC-LAG based on BFD with IP/MPLS, alternative embodiment(s) will now be described. Like the previous embodiments, these alternative embodiments allow for link failure detection in an MC-LAG based on the BFD protocol. However, unlike the previous embodiments, these embodiments do not use MPLS. Therefore, the embodiments described below present selection of IP address families mechanisms enabling the use of BFD in an MC-LAG environment.

Figure 4:
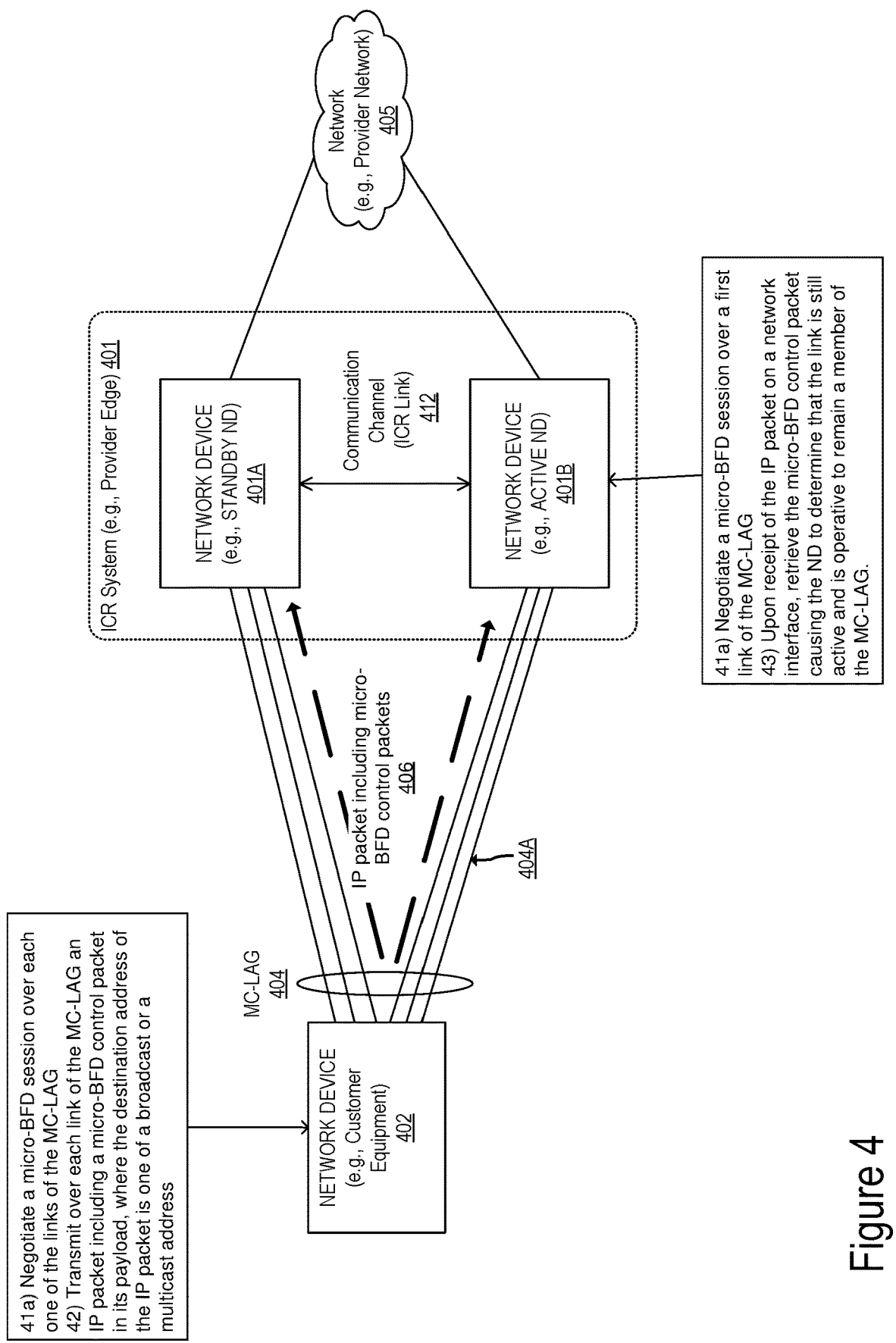
FIG. 4 illustrates a block diagram of an exemplary network including an ICR system coupled with a network device through an MC-LAG enabling link failure detection according to some embodiments of the invention.

FIG. 4 illustrates a block diagram of an exemplary network including an ICR system coupled with a network device through an MC-LAG enabling link failure detection according to some embodiments. In these embodiments, the elements of the MC-LAG system are configured such that ND 401A and ND 401B of the ICR system 401 appear as a single network device both with respect to the Link Aggregation control protocol (LACP) and the BFD protocol. This results in a seamless use of BFD over LAG for detection of link failures at the MC-LAG 404. In some embodiments, when IPv4 is used, a subnet broadcast IP address or alternatively a link-local multicast address is used as the destination IP address for transmitting micro-BFD control packets (where the micro-BFD packets are associated with a micro-BFD session established on a link of the MC-LAG coupling a network device with the NDs of the ICR system). In other embodiments, when IPv6 is used, a multicast IP address is used as the destination IP address for transmitting the micro-BFD control packets associated with each micro-BFD session established on a link of the MC-LAG coupling a network device with the NDs of the ICR system.

FIG. 4 illustrates an ICR system 401 coupled with ND 402 through an MC-LAG 404 according to some embodiments. ICR system 401 typically includes two network devices 401A and 401B. However, while in some embodiments, the ICR system is described with regard to two network devices (e.g., a first device acting as an active device and a second network device acting as a standby device); in other embodiments, a different number of devices can be included as part of the ICR system. For example, the redundant system may include N network devices acting as active devices and M network devices acting as standby devices without departing from the scope of the present invention. In some embodiments, the active ND is responsible for handling (i.e., processing and forwarding) network traffic received from one or more other network devices (e.g., ND 402). In other embodiments, the traffic received at the ND 402 can be distributed according to a load balancing mechanism towards the two network devices ND 401A and ND 401B according to the availability of the links of the MC-LAG. In some embodiments, Virtual Router Redundancy Protocol (VRRP) can be implemented on each one of the network devices of the ICR system 101 and define a VRRP group and can be used to manage the redundancy system and the states of each of the network devices within the system.

The two network devices ND 401A and ND 401B are coupled to each other through a communication channel referred to herein as an inter-chassis redundancy link 412. The ICR link enables the two network devices to exchange control messages as well as traffic (i.e., data packets). In some embodiments, each one of the NDs 401A-B and 402 is implemented as described in further details below with respect to FIGS. 7A-E.

Similarly to the NDs described with reference to FIG. 1, the NDs 401A, 401B and 402 may be part of a packet network coupling a subscriber with a service offered over the packet network. In some embodiments, the ICR system 401 implements a PE, while the ND 402 implements a CE. The CE couples one or more end users' devices to a provider's network 405 through the PE.

At operations 41a and 41b, for each link of the MC-LAG 404 a micro-BFD session is negotiated between two NDs. In some embodiments, the control plane of each ND 401A-B and 402 initiates a BFD session negotiation for each one of the links of the MC-LAG 404, coupling network interfaces of the respective network devices. For example, a micro-BFD session is established for link 404A, which couples a first network interface of ND 402 with a second network interface of ND 401B. During this initial step an IP destination address is selected. The IP destination address is used in the transmission of IP packets including the micro-BFD control packets of the micro-BFD sessions.

Once the micro-BFD sessions are established for the links of MC-LAG 404, IP packets including micro-BFD control packets are asynchronously transmitted, at operation 42, from a first ND (e.g., ND 402) towards the ND including the peer network interface (e.g., ND 401A or 401B) for example through the link 404A. While the following description describes micro-BFD control packets transmitted from ND 402 to ND 401B through the link 404A, one of ordinary skill in the art will recognize that each of one of the links members of the MC-LAG may transmit micro-BFD control packets asynchronously through a peer interface on a peer network device and the operations described herein with respect to link 404A apply to other links of the MC-LAG without departing from the scope of the present invention. Thus in these embodiments, for each micro-BFD session, micro-BFD control packets are transmitted as IP packets 406 including an IP header towards the next hop network device.

Figure 5:
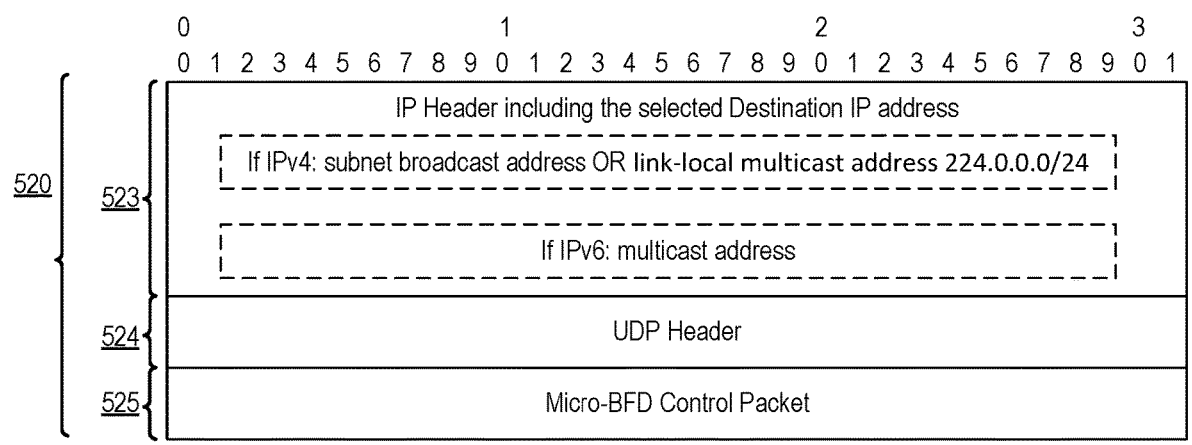
FIG. 5 illustrates an exemplary IP encapsulated micro-BFD packet according to some embodiments of the invention.

FIG. 5 illustrates an exemplary IP packet including micro-BFD packet according to some embodiments of the invention. The packet 520 includes an IP header 523, an UDP header 524 and a micro-BFD control packet 525. The micro-BFD control packet is associated with the session established for the link transmitting the packet (e.g., link 404A). Depending on the IP protocol used, the IP header 523 includes as the destination address a selected broadcast or multicast address. If the IPv4 protocol is used for a micro-BFD session, then the link-local multicast address family 224.0.0.0/24 is used as the destination IP address. In other embodiments, the subnet's broadcast address (where the subnet includes the network devices of the ICR system) may be used as the destination IP address as well. Alternatively, if the IP protocol is IPv6, then the IPv6 link-local multicast address family FF02:0:0:0:0:0:0:2 is used as the destination IP address. In some embodiments two micro-BFD sessions, one with IPv4 and one with IPv6 addresses, may run concurrently. The packet 520 further includes the micro-BFD control packet 525.

Referring back to FIG. 4, flow then moves from operation 42 to operation 43, at which ND 401B, upon receipt of the IP packet on a network interface, retrieves the micro-BFD control packet from the received IP packet and process the micro-BFD control packet causing the ND to determine that the link is still active and is operative to remain a member of the MC-LAG. The present embodiments enable the BFD control packets to be forwarded from ND 402 to the next hop network device ND 401B without the risk of being forwarded outside this device. Upon receipt of the micro-BFD control packet, ND 401A determines that the link associated with the micro-BFD session is still active.

The same template of packets (i.e., template 520) is used by ND 402 on all member links of the MC-LAG, regardless of whether it is connected to ND 401A or ND 401B enabling the detection of failure at the MC-LAG based on BFD sessions established on each link. According to these embodiments, micro-BFD control packets are broadcast towards the devices of the ICR system of the MC-LAG (by using a multicast IP address or broadcast IP address as the destination address of the IP packets including the micro-BFD control packets) enabling the system to detect link failures based on the BFD protocol as fast as 10 msec. As a result, convergence within the MC-LAG redundant group (e.g., switchover between the active ND and the standby ND) can be in sub-second range interval (i.e., milliseconds range) which is far better then what can be provided with the use of standard LACP.

The operations in the flow diagram of FIG. 6 will be described with reference to the exemplary embodiments of the FIGS. 4 and 5. However, it should be understood that the operations of the flow diagram can be performed by embodiments of the invention other than those discussed with reference to the other figures, and the embodiments of the invention discussed with reference to these other figures can perform operations different than those discussed with reference to the flow diagram of FIG. 6.

Figure 6:
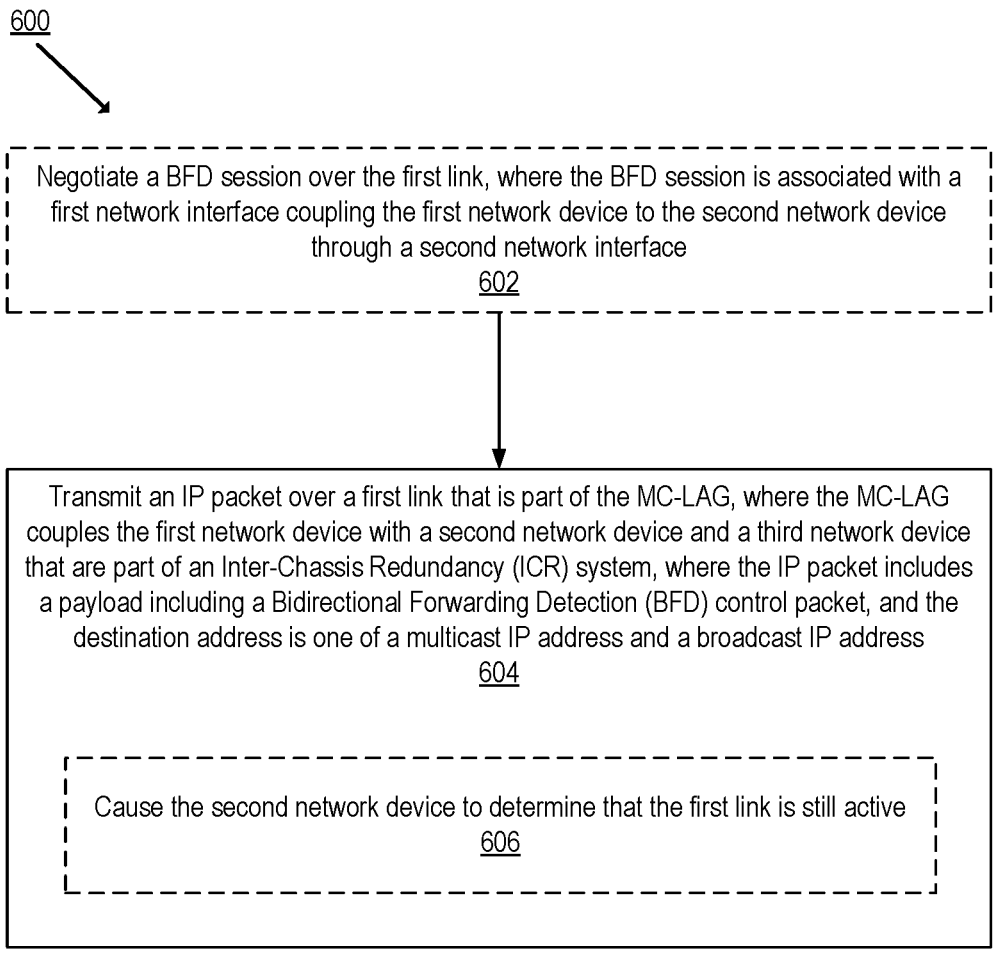
FIG. 6 illustrates a flow diagram of exemplary operations for enabling link failure detection in an MC-LAG according to some embodiments of the invention.

FIG. 6 illustrates a flow diagram of exemplary operations 600 for enabling link failure detection in an MC-LAG according to some embodiments of the invention. At operation 602 a first network device (e.g., ND 402) negotiates a BFD session over a first link (e.g., link 404A) with a second ND (e.g., ND 401B). The BFD session is associated with a first network interface coupling the first network device to the second network device through a second network interface. The ND transmits an IP packet (e.g., IP packet of format 520) over the first link of the MC-LAG, where the MC-LAG couples the first network device with a second network device and a third network device (e.g., ND 401A). The second and third network devices are part of an ICR system (e.g., ICR system 401). The IP packet (e.g., 520) includes a payload that includes a Bidirectional Forwarding Detection (BFD) control packet 535, where the destination address is whether a multicast or broadcast destination address depending on the IP protocol. The BFD control packet is associated with the micro-BFD session over the first link and the IP packet is transmitted towards the second network device causing the second network device to determine that the first link is still active. The transmission of the BFD control packet causes the second network device to determine that the link of the MC-LAG is still active enabling the use of BFD in an MC-LAG environment.

The embodiments described herein present two mechanisms of enabling the use of BFD to allow efficient and fast convergence of link failure detection in an MC-LAG. In particular the present embodiments, enable the establishment of micro-BFD sessions for each link of the MC-LAG and transmission of micro-BFD control packets for each link while keeping track of the state of the links through BFD and relaying the state information to LACP for efficient and time effective link management at the MC-LAG. The various embodiments described herein present clear advantages with respect to prior approaches which uses LACP for link failure detection.

Figure 7A:
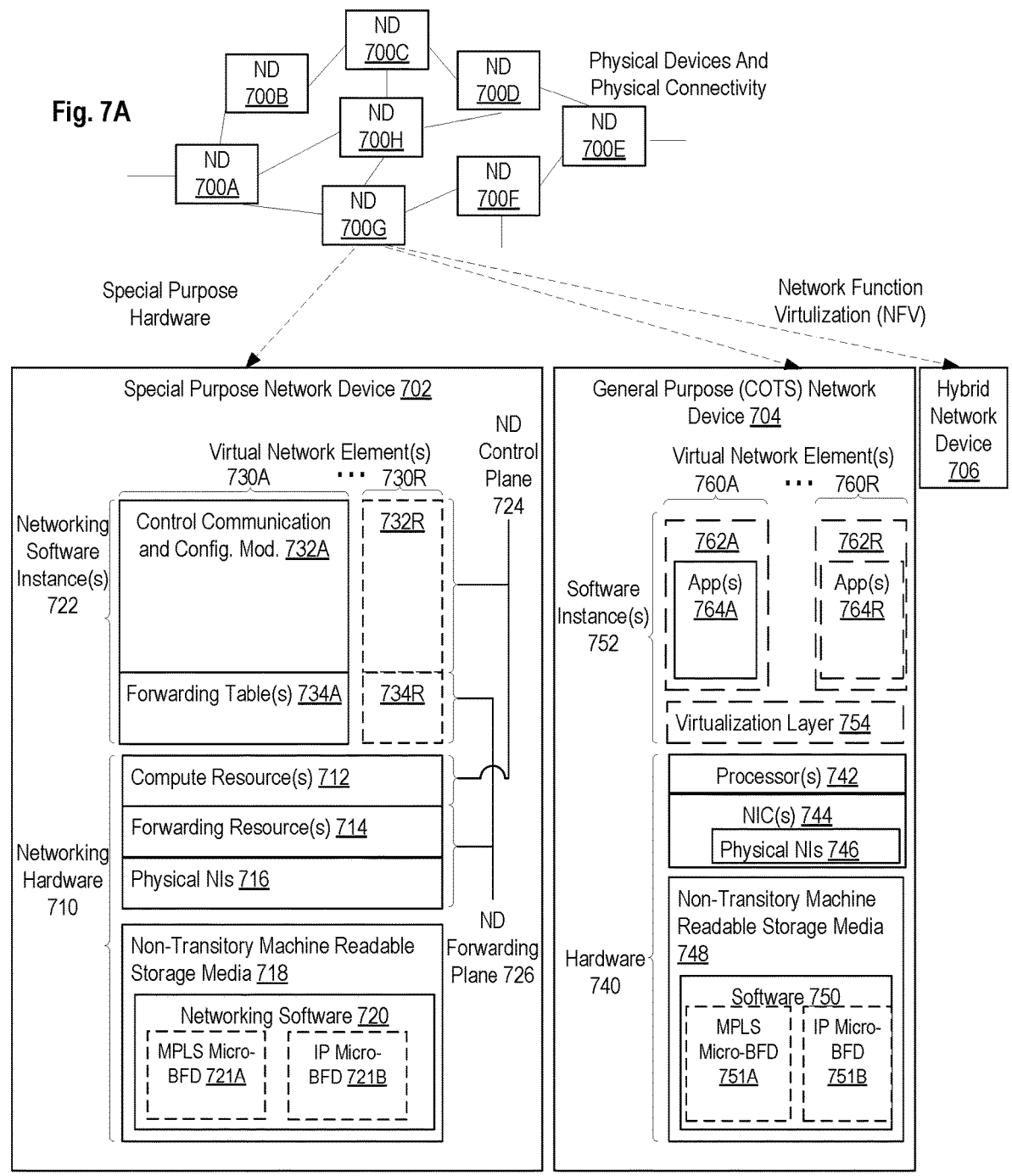
FIG. 7A illustrates connectivity between network devices (NDs) within an exemplary network, as well as three exemplary implementations of the NDs, according to some embodiments of the invention.

Architecture:

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). Networking software 720 can include code (e.g., MPLS micro-BFD 721A or IP micro-BFD 721B) which when executed by networking hardware 710, causes networking hardware 710 to perform operations of one or more embodiments of the present invention as part networking software instances 722.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
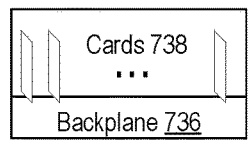
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers). Software 750 can include code (e.g., MPLS micro-BFD 751A or IP micro-BFD 751B) which when executed by networking hardware 740, causes networking hardware 740 to perform operations of one or more embodiments of the present invention as part of containers 762.

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the NIC(s) 744, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
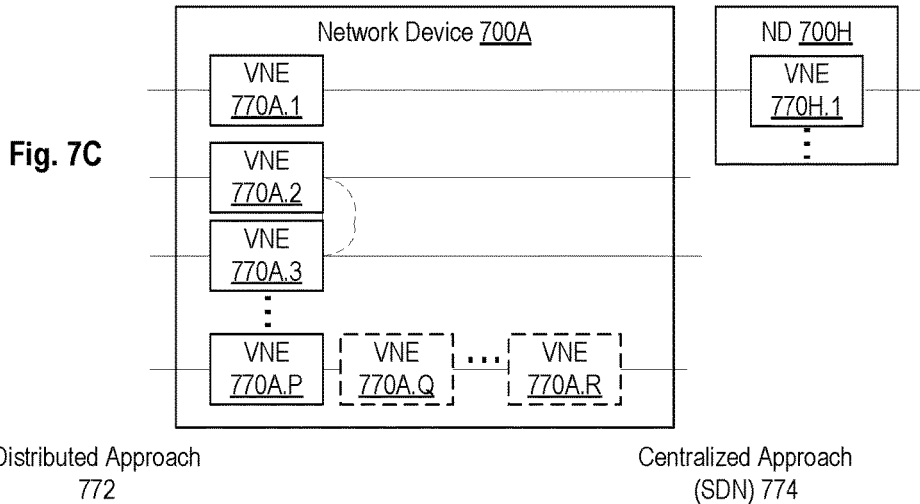
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an IETF Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
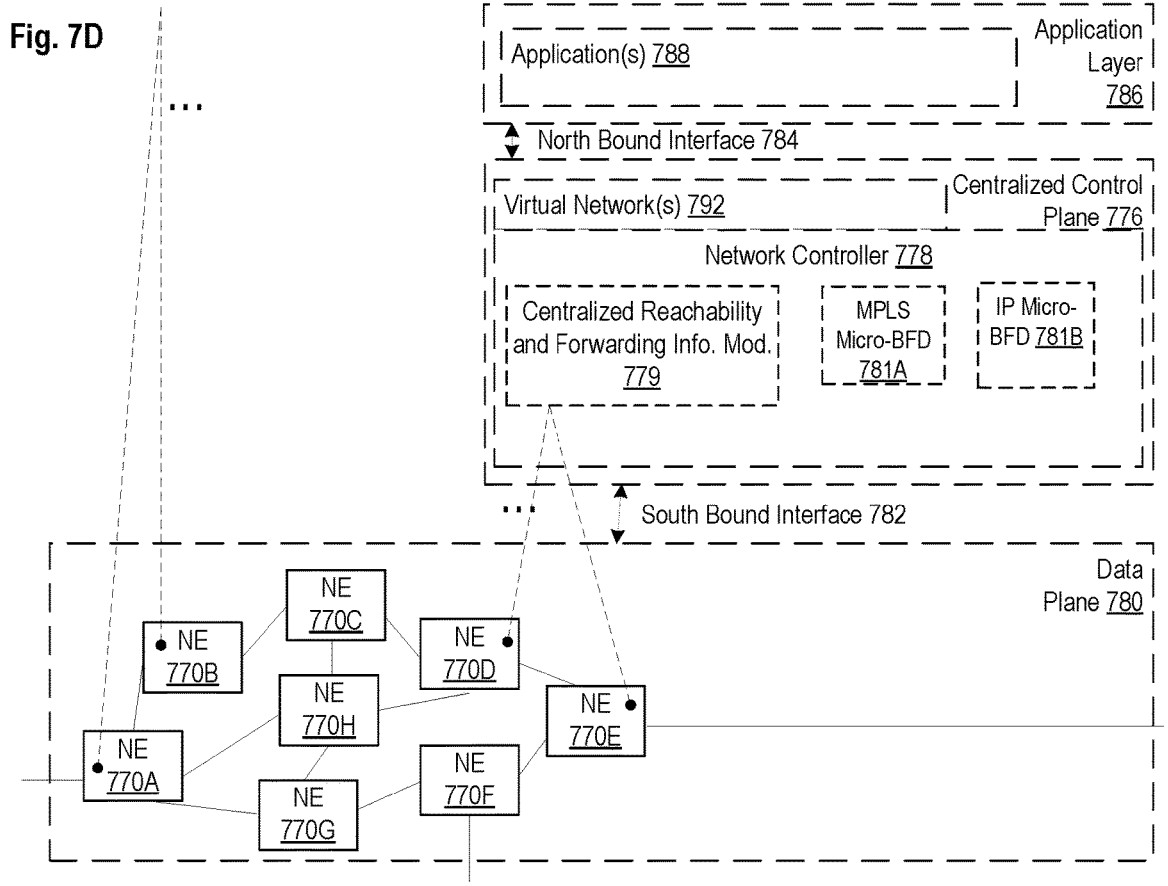
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
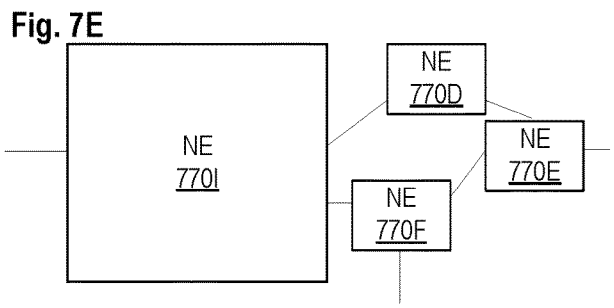
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
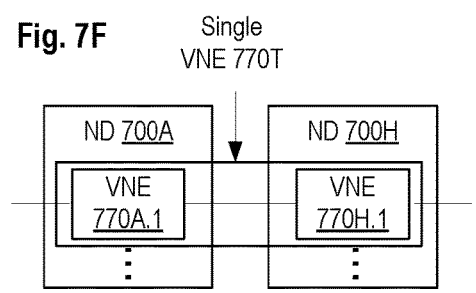
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
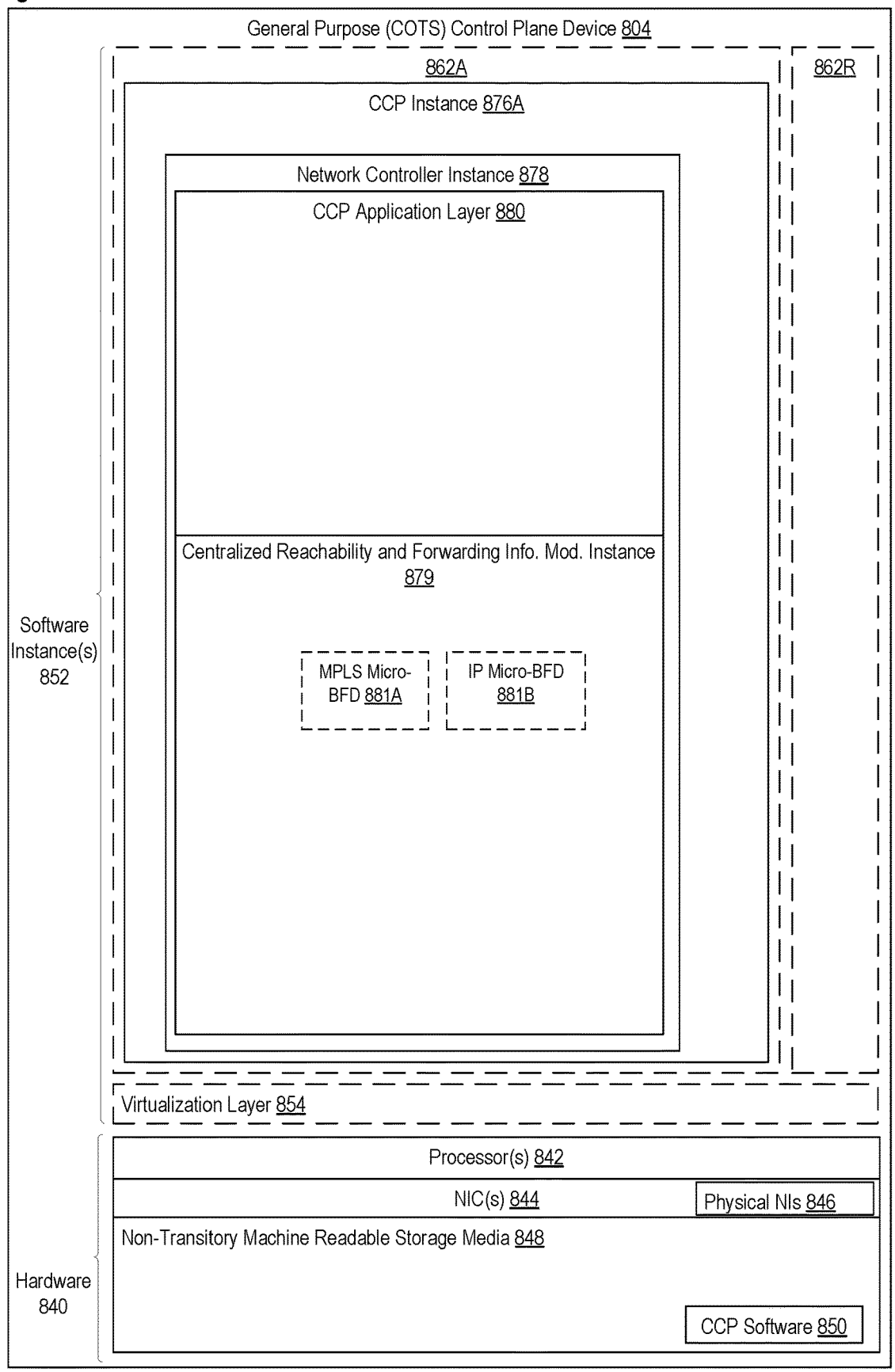
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) includingdrivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device in a packet network of enabling link failure detection in a multi-chassis link aggregation group (MC-LAG), the method comprising:
transmitting an Internet Protocol (IP) packet over a first link that is part of the MC-LAG, wherein the MC-LAG couples the first network device with a second network device and a third network device that are part of an Inter-Chassis Redundancy (ICR) system, wherein the IP packet includes a payload including a Bidirectional Forwarding Detection (BFD) control packet, the BFD control packet encapsulated with a Generic Associated Channel Label (GAL) header as a single label in a Multiprotocol Label Switching (MPLS) stack, wherein the GAL header includes an IP header and an UDP header and wherein the IP header includes as a destination address a broadcast address or a multicast address depending on an IP protocol,
wherein the destination address of the IP packet is selected from one of (a) an IP version 4 (IPv4) subnet broadcast address family, (b) an IP version 4 (IPv4) multicast address family 224.0.0.0/24 and (c) IP version 6 (IPv6) multicast address family FF02:0:0:0:0:0:2.

2. The method of claim 1, further comprising negotiating a BFD session over the first link, wherein the BFD session is associated with a first network interface coupling the first network device to the second network device through a second network interface.

3. The method of claim 2, wherein the BFD control packet is associated with the BFD session over the first link and the IP packet is transmitted towards the second network device causing the second network device to determine that the first link is still active.

4. A first network device in a packet network for enabling link failure detection in a multi-chassis link aggregation group (MC-LAG), the first network device comprising:
one or more processors and a non-transitory computer readable storage medium, said non-transitory computer readable storage medium containing instructions, which when executed by the one or more processors, causes the first network device to:
transmit an Internet Protocol (IP) packet over a first link that is part of the MC-LAG, wherein the MC-LAG couples the first network device with a second network device and a third network device that are part of an Inter-Chassis Redundancy (ICR) system, wherein the IP packet includes a payload including a Bidirectional Forwarding Detection (BFD) control packet, the BFD control packet encapsulated with a Generic Associated Channel Label (GAL) header as a single label in a Multiprotocol Label Switching (MPLS) stack, wherein the GAL header includes an IP header and an UDP header and wherein the IP header includes as a destination address a broadcast address or a multicast address depending on an IP protocol, wherein the destination address of the IP packet is selected from one of (a) an IP version 4 (IPv4) subnet broadcast address family, (b) an IP version 4 (IPv4) multicast address family 224.0.0.0/24 and (c) IP version 6 (IPv6) multicast address family FF02:0:0:0:0:0:0:2.

5. The first network device of claim 4, wherein the one or more processors are further to negotiate a BFD session over the first link, wherein the BFD session is associated with a first network interface coupling the first network device to the second network device through a second network interface.

6. The first network device of claim 5, wherein the BFD control packet is associated with the BFD session over the first link and the IP packet is to be transmitted towards the second network device to cause the second network device to determine that the first link is still active.

7. A non-transitory machine-readable storage medium that provides instructions that, if executed by a processor of a first network device, will cause said processor to perform operations comprising:
transmitting an Internet Protocol (IP) packet over a first link that is part of a Multi-Chassis Link Aggregation Group (MC-LAG), wherein the MC-LAG couples the first network device with a second network device and a third network device that are part of an Inter-Chassis Redundancy (ICR) system, wherein the IP packet includes a payload including a Bidirectional Forwarding Detection (BFD) control packet, the BFD control packet encapsulated with a Generic Associated Channel Label (GAL) header as a single label in a Multiprotocol Label Switching (MPLS) stack, wherein the GAL header includes an IP header and an UDP header and wherein the IP header includes as a destination address a broadcast address or a multicast address depending on an IP protocol,
wherein the destination address of the IP packet is selected from one of (a) an IP version 4 (IPv4) subnet broadcast address family, (b) an IP version 4 (Ipv4) multicast address family 224.0.0.0/24 and (c) IP version 6 (Ipv6) multicast address family FF02:0:0:0:0:0:0:2.

8. The non-transitory machine-readable storage medium of claim 7, wherein the operations further comprise negotiating a BFD session over the first link, wherein the BFD session is associated with a first network interface coupling the first network device to the second network device through a second network interface.

9. The non-transitory machine-readable storage medium of claim 8, wherein the BFD control packet is associated with the BFD session over the first link and the IP packet is transmitted towards the second network device causing the second network device to determine that the first link is still active.

10. A method in a first network device in a packet network of enabling link failure detection in a multi-chassis link aggregation group (MC-LAG), the method comprising:
receiving an Internet Protocol (IP) packet over a first link that is part of the MC-LAG, wherein the MC-LAG couples the first network device with a second network device, wherein the first network device is part of an Inter-Chassis Redundancy (ICR) system, wherein the IP packet includes a payload including a Bidirectional Forwarding Detection (BFD) control packet, the BFD control packet encapsulated with a Generic Associated Channel Label (GAL) header as a single label in a Multiprotocol Label Switching (MPLS) stack, wherein the GAL header includes an IP header and an UDP header and wherein the IP header includes as a destination address a broadcast address or a multicast address depending on an IP protocol; and
determining based on the BFD control packet that the first link is still active,
wherein the destination address of the IP packet is selected from one of (a) an IP version 4 (IPv4) subnet broadcast address family, (b) an IP version 4 (Ipv4) multicast address family 224.0.0.0/24 and (c) IP version 6 (Ipv6) multicast address family FF02:0:0:0:0:0:0:2.

11. The method of claim 10, further comprising negotiating a BFD session over the first link, wherein the BFD session is associated with a first network interface coupling the first network device to the second network device through a second network interface.

12. The method of claim 11, wherein the BFD control packet is associated with the BFD session over the first link.

13. A first network device in a packet network for enabling link failure detection in a multi-chassis link aggregation group (MC-LAG), the first network device comprising:
one or more processors and a non-transitory computer readable storage medium, said non-transitory computer readable storage medium containing instructions, which when executed by the one or more processors, causes the first network device to:
receive an Internet Protocol (IP) packet over a first link that is part of the MC-LAG, wherein the MC-LAG couples the first network device with a second network device, wherein the first network device is part of an Inter-Chassis Redundancy (ICR) system, wherein the IP packet includes a payload including a Bidirectional Forwarding Detection (BFD) control packet, the BFD control packet encapsulated with a Generic Associated Channel Label (GAL) header as a single label in a Multiprotocol Label Switching (MPLS) stack, wherein the GAL header includes an IP header and an UDP header and wherein the IP header includes as a destination address a broadcast address or a multicast address depending on an IP protocol; and
determine based on the BFD control packet that the first link is still active,
wherein the destination address of the IP packet is selected from one of (a) an IP version 4 (Ipv4) subnet broadcast address family, (b) an IP version 4 (Ipv4) multicast address family 224.0.0.0/24 and (c) IP version 6 (Ipv6) multicast address family FF02:0:0:0:0:0:0:2.

14. The first network device of claim 13, wherein the one or more processors are further to negotiate a BFD session over the first link, wherein the BFD session is associated with a first network interface coupling the first network device to the second network device through a second network interface.

15. The first network device of claim 14, wherein the BFD control packet is associated with the BFD session over the first link.

16. A non-transitory machine-readable storage medium that provides instructions that, if executed by a processor of a first network device, will cause said processor to perform operations comprising:
receiving an Internet Protocol (IP) packet over a first link that is part of a multi-chassis link aggregation group (MC-LAG), wherein the MC-LAG couples the first network device with a second network device, wherein the first network device is part of an Inter-Chassis Redundancy (ICR) system, wherein the IP packet includes a payload including a Bidirectional Forwarding Detection (BFD) control packet, the BFD control packet encapsulated with a Generic Associated Channel Label (GAL) header as a single label in a Multi-protocol Label Switching (MPLS) stack, wherein the GAL header includes an IP header and an UDP header and wherein the IP header includes as a destination address a broadcast address or a multicast address depending on an IP protocol; and determining based on the BFD control packet that the first link is still active, wherein the destination address of the IP packet is selected from one of (a) an IP version 4 (IPv4) subnet broadcast address family, (b) an IP version 4 (Ipv4) multicast address family 224.0.0.0/24 and (c) IP version 6 (Ipv6) multicast address family FF02:0:0:0:0:0:2.

17. The non-transitory machine-readable storage medium of claim 16, wherein the operations further comprise negotiating a BFD session over the first link, wherein the BFD session is associated with a first network interface coupling the first network device to the second network device through a second network interface.

18. The non-transitory machine-readable storage medium of claim 17, wherein the BFD control packet is associated with the BFD session over the first link.

\* \* \* \* \*